No. 782,916.					Patented February 21, 1905.

UNITED STATES PATENT OFFICE.

WILLIAM MAGUIRE, OF TORONTO, CANADA.

COMPOSITION FOR BRICK, TILE, &c.

SPECIFICATION forming part of Letters Patent No. 782,916, dated February 21, 1905.

Application filed October 29, 1902. Serial No. 129,282.

*To all whom it may concern:*

Be it known that I, WILLIAM MAGUIRE, a subject of the King of Great Britain, residing at Toronto, in the county of York, Province of Ontario, and Dominion of Canada, have invented a certain new and useful Improved Composition for Brick, Tile, or the Like, of which the following is a specification.

This invention relates to an improved composition to be used in the manufacture of brick, tile, slabs, ornaments, vessels, table-tops, wainscoting, and the like and can be used to produce imitations of various articles manufactured of wood, stone, or metal or for plastering on wood-covered surfaces, to which it adheres firmly, the object being to manufacture these articles of a material better suited for, and more readily adapted to the purpose and at less cost, while its durability is equal to that for which it is substituted, besides being a non-conductor of heat or cold, impervious to water, and not affected by frost.

The manufacture is conducted without the aid of artificial heat for burning or drying; but by simply placing the composition when in a liquid or semiliquid state in a mold of the desired form or pattern of the article to be produced when at a certain stage a chemical change sets in, forming a new composition entirely from either or all the ingredients or constituent parts, or by spreading the composition over a wood-covered surface while in a semiliquid state and leveling the surface with a trowel or by pouring it on while in a more liquefied form and allowing it to flow to an even surface.

The composition for some purposes consists of magnesium chlorid and calcined magnesite mingled with sand, powdered glass, or various clays mixed in varying proportions, differing according to the article to be produced, and when at the proper stage of the chemical change or compounding process it is poured into a mold of the desired pattern, where it remains till the chemical compounding process is completed, when it is removed, and is then ready for use.

If a polished or finished surface is desired, the side of the mold representing such surface is lined or faced with glass, porcelain, or polished metal of the desired pattern, and when the face of the article is formed on such glass, porcelain, or polished metal it will present a polished surface equal to the surface on which it is molded.

Other surface ornamentations may also be formed by the use of a suitable bottom in the mold. For instance, the bottom could be provided with an ornamental figure cut in its surface which would produce a like figure in the face of the tile, brick, or the like.

The composition preferably consists of the aforesaid ingredients in the following proportions, by weight: magnesium chlorid, twenty-five to forty per cent.; powdered calcined magnesite, ten to twenty-five per cent.; glass, twenty-five per cent., and sand or clay, twenty-five per cent. These ingredients are mixed thoroughly to about the consistency of a thin liquid, which is poured into suitable molds and allowed to set and harden.

The advantages claimed for this form of my composition is that such goods as brick, tile, vessels, slabs, table-tops, wainscoting, base, ornaments, or wood-surfacing can be produced by chemical action and without the aid of heat or the process of burning and with highly-polished surface where required, suitable for numerous purposes in building, furnishing, or decorating both interior and exterior.

I claim as my invention—

A composition for a tile, brick or the like, composed of twenty-five to forty per cent. of magnesium chlorid, ten to twenty-five per cent. of calcined magnesite, about twenty-five per cent. of powdered glass and about twenty-five per cent. of sand or clay; all of said ingredients being mixed together in a liquid or semiliquid state and permitted to set or harden to form a strong, durable and practically unbreakable article, substantially as set forth.

WM. MAGUIRE.

Witnesses:
GEO. A. NEUBAUER,
CHARLES PAULSON.